United States Patent [19]

Aishima et al.

[11] 3,926,873

[45] Dec. 16, 1975

[54] THERMOPLASTIC MATERIAL COMPOSITIONS

[75] Inventors: Itsuho Aishima, Kurashiki; Atsushi Kitaoka, Kawashaki; Toshinori Koseki, Tokyo; Sachio Suzuki, Yokohama; Kenji Arimoto; Koichi Matsumoto, both of Kurashiki, all of Japan

[73] Assignee: Asahi Kasei Kogyo Kabushiki Kaisha, Osaka, Japan

[22] Filed: Dec. 18, 1972

[21] Appl. No.: 316,314

[30] Foreign Application Priority Data

Dec. 20, 1971 Japan............................ 46-102598
Dec. 20, 1971 Japan............................ 46-102600
Dec. 20, 1971 Japan............................ 46-102602
Apr. 18, 1972 Japan............................ 47-38287
Dec. 20, 1971 Japan............................ 46-102599
Dec. 20, 1971 Japan............................ 46-102601
Apr. 5, 1972 Japan............................ 47-33442
Oct. 16, 1972 Japan............................ 47-102635

[52] U.S. Cl. ........ 260/18 R; 260/18 N; 260/18 TN; 260/22 CB; 260/23 XA; 260/23 H; 260/23 S; 260/23.7 M; 260/37 R; 260/37 M; 260/37 N; 260/37 AL; 260/37 PC; 260/40 R; 260/42.14

[51] Int. Cl.$^2$ ..................... C08K 9/04; C08L 91/00

[58] Field of Search.. 260/41 B, 37 N, 40 R, 37 AL, 260/37 R, 37 M, 18 R, 18 N, 18 TN, 22 CB, 23 XA, 23 H, 23 S, 42.14, 23.7 M

[56] References Cited
UNITED STATES PATENTS

| | | | |
|---|---|---|---|
| 3,160,598 | 12/1964 | Delfosse................................ | 260/23 |
| 3,304,197 | 2/1967 | Pundsack et al.................. | 260/42.14 |
| 3,342,771 | 9/1967 | Cheritat et al........................ | 260/41 |
| 3,394,100 | 7/1968 | Falcone et al. ....................... | 260/41 |
| 3,471,439 | 10/1969 | Bixler et al. .......................... | 260/41 |
| 3,519,593 | 7/1970 | Bolger.................................... | 260/41 |
| 3,694,403 | 9/1972 | Aishima et al....................... | 260/41 |

*Primary Examiner*—James H. Derrington
*Attorney, Agent, or Firm*—Burgess, Dinklage & Sprung

[57] ABSTRACT

A thermoplastic composition comprising
A. about 15 to 90 percent by weight of thermoplastic and
B. about 85 to 10 percent by weight of at least one reactive inorganic filler,
said reactive inorganic filler having been prepared by effecting reaction between
 a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having number average particle diameter of from about 0.01 $\mu$. to about 50 $\mu$. and a maximum particle diameter of about 100 $\mu$., and
 b. at least one unsaturated aliphatic or aromatic carboxylic acid having from 3 to 11 carbon atoms, one or two ethylenic unsaturations, and one or two carboxyl groups, the proportion of said unsaturated aliphatic or aromatic carboxylic acid being from about 0.05 to about 20 percent by weight of the total weight of said inorganic material,
with stirring in the absence of liquid-form water in the powder state of said inorganic material at a temperature up to the temperature at which said unsaturated aliphatic or aromatic carboxylic acid begins to decompose.

The compositions have improved mechanical properties, especially such as Izod impact strength and rigidity and excellent processability.

37 Claims, No Drawings

THERMOPLASTIC MATERIAL COMPOSITIONS

BACKGROUND OF THE INVENTION

This invention relates to thermoplastic material compositions having excellent mechanical properties, especially Izod impact strength and rigidity, and remarkable processability.

Methods are already available for improving various properties of plastic materials by incorporating thereinto inorganic fillers. For example, "Journal of the Society of Rubber Industry, Japan" (Vol. 10 No. 5, 1967) describes that the calcium carbonate activated with sorbic acid has a higher reinforcing effect on SBR, oil-extended SBR, polybutadiene or EPDM than usual calcium carbonate. According to this report the active calcium carbonate is prepared by introducing sorbic acid into an aqueous calcium hydroxide solution while continuously adding carbon diocide thereinto. In comparison with usual calcium carbonate, the active calcium carbonate indeed accelerates the vulcanization of the rubbers more remarkably to afford vulcanizates having high modulus and high tensile strength at break, but is not satisfactory in improving Izod impact strength of plastic materials. In addition, the method for preparing the active calcium carbonate has such a drawback that the particle size of the produced active calcium carbonate is hardly controlled because the method requires drying, pulverizing and classifying procedures.

U.S. Pat. No. 3694403 teaches that polyolefin compositions having improved transparency and rigidity may be obtained by mixing a polyolefin with magnesium carbonate and an unsaturated carboxylic acid such as acrylic acid, methacrylic acid or the anhydrides. The improvements in mechanical strength, especially Izod impact strength, rigidity and processability are, however, not always satisfactory. Furthermore, the reaction between the magnesium carbonate and unsaturated carboxylic acid is incomplete and the unreacted unsaturated carboxylic acid remains in the polyolefin composition. Thus, the shaped structures obtained therefrom tend to have foamed or hygroscopic surfaces.

In order to producing active inorganic fillers it is also known in the mechanico-chemical field to polymerize a reactive monomer compound onto newly created surfaces of inorganic fillers caused by pulverization. But when such active inorganic fillers are incorporated with plastic materials, the resulting compositions still do not show sufficient mechanical properties such as Izod impact strength.

Thus none of the conventional methods provides for thermoplastic material compositions having satisfactorily improved Izod impact strength, rigidity and processability.

THE INVENTION

In accordance with this invention, there are provided thermoplastic material compositions having excellent Izod impact strength, rigidity and processability, and comprising A. about 15 to 90 percent by weight of thermoplastic material and
B. about 85 to 10 percent by weight of at least one reactive inorganic filler,
    said reactive inorganic filler having been prepared by effecting reaction between a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$. to about 50 $\mu$. and a maximum particle diameter of about 100 $\mu$., and b. at least one unsaturated aliphatic or aromatic carboxylic acid having from 3 to 11 carbon atoms, one or two ethylenic unsaturations, one or two carboxyl groups, the proportion of said unsaturated aliphatic or aromatic carboxylic acid being from about 0.05 to about 20 percent by weight of the total weight of said inorganic material, with stirring in the absence of liquid-form water in the powderly state of said inorganic material at a temperature up to the temperature at which said aliphatic or aromatic carboxylic acid begins to decompose.

Suitable examples of such unsaturated aliphatic or aromatic carboxylic acids having from 3 to 11 carbon atoms, one or two ethylenic unsaturations, and one or two carboxylic groups which may be employed in the preparation of the reactive inorganic fillers include acrylic acid, methacrylic acid, alpha-ethylacrylic acid, alpha-chloroacrylic acid, alpha-bromoacrylic acid, alpha-fluoroacrylic acid, N-carbomethyl-alpha-aminoacrylic acid, atropic acid, angelic acid, crotonic acid, beta-aminocrotonic acid, alpha-ethylcrotonic acid, cinnamic acid, o-, m-, or p-carboxycinnamic acid, o-, m-, or p-aminocinnamic acid and o-, m-, or p-hydroxycinnamic acid, butadiene-1-carboxylic acid, sorbic acid, styrylacrylic acid, muconic acid, beta-2-furylacrylic acid, vinylacetic acid, allylacetic acid, styrylacetic acid, allylmalonic acid, vinylglycolic acid, piroterebic acid, itaconic acid, maleic acid, fumaric acid, citraconic acid, aconitic acid, isopropylidene succinic acid, endo-bicyclo (2,2,1)-5-heptene-2,3-dicarboxylic acid. Two or more such compounds may be used in combination. As for the water content of these unsaturated carboxylic acids, the smaller the better and practically it is preferred that the water content is at most about 5 percent by weight .

Suitable examples of the inorganic materials substantially comprising such metal carbonates, metal oxides and metal hydroxides include heavy calcium carbonate, precipitated calcium carbonate, natural magnesite [$MgCO_3$], natural hydromagnetite [$3MgCO_3 \cdot Mg(OH)_3 \cdot 3H_2O$ or $4MgCO_3 \cdot Mg(OH)_3 \cdot 4H_2O$], and synthetic basic magnesium carbonate [$3MgCO_3 \cdot Mg(OH_2) \cdot 3H_2O$–$4MgCO_3 \cdot Mg(OH)_2 \cdot 4H_2O$], calcium magnesium carbonate, beryllium carbonate, beryllium oxycarbonate [$(BeO)_x (BeCO_3)_y$], strontium carbonate, zinc carbonate, cadmium carbonate, beryllium oxide, magnesium oxide, calcium oxide, strontium oxide, barium oxide, zinc oxide, cadmium oxide, aluminum oxide, aluminum oxide monohydrate [$Al_2O_3 \cdot H_2O$], aluminum oxide dihydrate [$Al_2O_3 \cdot 2H_2O$], aluminum oxide trihydrate [$Al_2O_3 \cdot 3H_2O$]; and beryllium hydroxide, magnesium hydroxide, calcium hydroxide, strontium hydroxide berium hydroxide, zinc hydroxide, cadmium hydroxide and aluminum hydroxide. Two or more such compounds may be used in combination.

The number average particle size of the metal carbonates, metal oxides and metal hydroxides used in this invention is from about 0.01 $\mu$. to about 50 $\mu$., preferably from about 0.1 $\mu$. to about 10 $\mu$., and the maximum particle diameter is about 100 $\mu$., and preferably about 50 $\mu$. With regard to the water content, the smaller the better and practically it is preferred that the water content is at most about 2 percent.

The proportion of the unsaturated aliphatic or aromatic carboxylic acids is about 0.05 to about 20 percent by weight, preferably about 0.10 to 20 percent by weight, of the total weight of the metal carbonates, metal oxides or metal hydroxides. However, this proportion varies depending upon the number average particle diameter of such metal compounds. That is, when the number average particle diameter is from about 0.01 $\mu$. to about 0.10 $\mu$., the proportions of the unsaturated aliphatic or aromatic carboxylic acids is from about 0.5 to about 20.0 percent by weight, preferably 1.0 to 10.0 percent by weight of the total weight of the metal compounds, and when the number average particle diameter is from about 0.1 $\mu$. to about 10.0 $\mu$., the proportion is from about 0.1 to about 10.0 percent by weight, preferably from about 0.5 to about 5.0 percent by weight, of the total weight of the metal compounds. When the number average particle diameter is from about 10 $\mu$. to about 50 $\mu$., the proportion is from about 0.05 to about 5.00 percent by weight, preferably from about 0.1 to about 2.0 percent by weight, of the total weight of the metal compounds.

When the proportion of the unsaturated aliphatic or aromatic carboxylic acid is more than about 20 percent weight, the processability of hte thermoplastic material compositions is remarkably reduced and surfaces of shaped structures obtained from these compositions are discolored due to foaming. On the other hand, proportions of less than about 0.5 percent by weight do not form an effective layer on inorganic materials and the mechanical properties of the compositions are not satisfactorily improved.

The reactive inorganic fillers of this invention are produced by effecting reaction between the inorganic material substantially comprising the metal carbonates, metal oxides or metal hydroxides and the unsaturated aliphatic or aromatic carboxylic acids in the absence of liquid-form water in the powder state of said inorganic material at a temperature up to the temperature at which the unsaturated aliphatic or aromatic carboxylic acids begin to decompose, typically from about 10°C., preferably from about 50°C. to about 200°C., more preferably from about 80°C. to about 150°C. with stirring.

It is essential that this reaction is carried out in the absence of water in the form of liquid by mixing the inorganic materials in the powder state and the unsaturated aliphatic or aromatic carboxylic acids with stirring. The evolved water and the evolved carbon dioxide in the case where the inorganic materials are the metal carbonates, are removed from the reaction system. In preparing the reactive inorganic fillers of this invention the presence of water in the form of liquid prevents formation of an effective layer of the reaction products, on the surface of the inorganic material, between the inorganic materials and the unsaturated aliphatic or aromatic carboxylic acids, because the effective layer is mostly separated into water from the reactive inorganic fillers produced.

The reactive inorganic fillers thus obtained have an effective layer on reaction products, of the surface of the inorganic materials, between the inorganic materials and the unsaturated aliphatic or aromatic carboxylic acids of from about 5 A to 150 A, preferably from 10 A to 100 A, calculated by the BET specific surface area measuring method. It might be considered that the carboxylate ion of the unsaturated aliphatic or aromatic acids forms an ionic bond with the metal ion on the crystal surface of the inorganic materials.

The reaction may be carried out in the presence or absence of an organic solvent which does not ionize the metal carbonates, hydroxides and oxides, the unsaturated aliphatic or aromatic carboxylic acids and the reaction products formed by reaction between the metal carbonates, hydroxides, oxides and the unsaturated aliphatic or aromatic carboxylic acids, but dissolves the acids.

Such solvents include, for example, benzene, toluene, xylene, hexane, cyclohexane, heptane, decane, decalin, tetralin, carbon tetrachloride, chloroform, ethylene chlorides, ethyl ether, propyl ethers, butyl ethers, acetone, methylethyl ketone, ethyl acetate and butyl acetates.

The reaction pressure is not critical. It may be carried out at atmospheric pressure, and may also be carried out under reduced pressures or under pressures up to about 10 Kg./cm$^2$. The reaction time varies depending upon the other conditions and, in general, from about 1 minute to about 2 hours, preferably from about 10 minutes to about 40 minutes.

As an apparatus for the reaction, any conventional mixing apparatus and any conventional autoclaves may be utilized and high-speed agitators such as Henschel mixer are preferred.

The thermoplastic materials which may be employed in the practice of this invention include polyolefins such as high pressure, middle pressure and low pressure polyethylene, crystalline isotactic polypropylene, crystalline polybutene, poly-3-methyl-butene-1, poly-4-methyl-pentene-1 and copolymers comprising more than about 80 percent by weight of ethylene or propylene and less than 20 percent by weight of a comonomer selected from, ethylene, propylene, butene-1, pentene-1, hexane-1, 3-methyl butene-1, and 4-methyl pentene-1 and mixtures thereof; polyamides such as polycaprolactom, polyhexamethylene adipamide, polyhexamethylene sebacamide, poly-omega-aminoundecanoic acid, poly-omega-laurolactam and mixtures thereof; polyacetals such as polyoxymethylene homopolymers and copolymers of polyoxymethylenes containing from about 80 percent to 95 percent recurring units of oxymethylene, typically terminated with acyl or isocyanate groups and mixtures thereof; polyesters such as polyethylene terephthalate, polyethylene isophthalate, poly-p-ethylene oxybenzoate, polyethylene-1,2-diphenoxyethane-4, 4'-dicarboxylate and copolyesters such as polyethylene terephthalate-isophthalate, polyethylene terephthalate-5-sodium sulfoisophthalate and mixtures thereof; polyvinyl chlorides such as polyvinyl chloride, polyvinylidene chloride, copolymers thereof, postchlorinated polyvinyl chlorides, mixtures of polyvinyl chlorides with chlorinated polyethylenes or acrylonitrile butadiene-styrene copolymers; mixtures of about 95 to 40 percent by weight, preferably about 90 to 50 percent by weight of the polyolefins and about 5 to 60 percent by weigth, preferably about 10 to 50 percent by weight of elastomeric materials such as natural rubber and synthetic elastomers such as isoprene rubber, butadiene rubber, styrene-butadiene rubber, butyl rubber, ethylenepropylene rubber, chloroprene rubber, nitrile rubber, acrylic rubber, ethylene-vinyl acetate copolymer, styrene-butadiene block copolymer, and mixtures thereof; polystyrenes, copolymers of styrene with butadiene and acrylonitrile; polyacrylonitriles; polyphenylene oxides; and polycarbonates.

In order to prepare the thermoplastic material compositions of this invention, the thermoplastic material and reactive inorganic filler are reacted in a melt with mixing at a temperature of from about 120°C. to about 300°C.

When the thermoplastic and reactive inorganic filler are reacted in a melt with mixing, convention radical generators may be incorporated therein in order to promote the reaction between the polymer radical of the thermoplastic material and the layer of the reaction products between the unsaturated aliphatic or aromatic carboxylic acids and the inorganic materials on their surface.

Suitable radical generators include, for example, tetravalent organotin compounds such as dibultin oxide; organic peroxides such as 2,5-dimethyl-2,5-di(t-butylperoxy)hexane, 2,5-dimethyl-2,5-di(t-butylperoxy) hexyne-3, dicumyl peroxide, t-butyl peroxy maleic acid, lauroyl peroxide, benzoyl peroxide, t-butyl perbenzoate, di(t-butyl)hexane, t-butyl hydroperoxide, isopropyl percarbonate; azo compounds such as azobis-isobutyronitrile, and inorganic peroxides such as ammonium persulfate.

The radical generators are generally used in an amount of about 0.001 to about 0.1 percent by weight of the total weight of the composition. The mixing temperature, however, varies depending upon kinds of the thermoplastic materials, the reactive inorganic fillers and mixing apparatus to be used and the presence or absence of additives or radical generators. The preferred temperature ranges are as follows.

| Thermoplastic material | Mixing temperature range Preferred (°C.) | More preferred (°C.) |
| --- | --- | --- |
| Polyolefins | 120 – 300 | 150 – 250 |
| Polyacetals | 180 – 250 | 180 – 200 |
| Polyesters | 250 – 300 | 260 – 280 |
| Polyamides | From melting point to 300 | |
| Polyvinylchlorides | 140 – 250 | 160 – 200 |
| Mixtures of polyolefins and elastomeric material | 140 – 300 | 170 – 280 |

The reactive inorganic fillers are employed in an amount of about 85 to 10 percent by weight of the total weight of the composition. The amount of the reactive inorganic fillers, however, varies depending upon kinds of the thermoplastic materials and desired purposes of the compositions. The preferred amounts are as follows;

| Thermoplastic material | Reactive inorganic filler Preferred amount (weight percent) | More preferred amount (weight percent) |
| --- | --- | --- |
| Polyolefins | 85 – 20 | 70 – 50 |
| Polyacetals | 70 – 10 | 50 – 10 |
| Polyesters | 70 – 10 | 50 – 20 |
| Polyamides | 80 – 10 | 50 – 20 |
| Polyvinylchlorides | 80 – 10 | 50 – 20 |
| Mixtures of polyolefins and elastomeric materials | 85 – 20 | 70 – 50 |

Before the thorough mixing under the conditions mentioned above, it is preferably to pre-mix the components of the compositions and any conventional methods of mixing are applicable.

For the purpose of uniformly melt-mixing, a screw extruder, Bunbury mixer, mixing roll, kneader, Henschel mixer, or other conventional mixing apparatus may be conveniently employed, and for the purpose of premixing a drum-blender, V-type blender, Henschel mixer or other conventional mixing apparatus may be utilized.

The novel thermoplastic compositions comprising the reactive inorganic filler at a high concentration and thermoplastic material are characterized by improvements in 1. mechanical properties such as Izod impact strength, tensile strength, tensile modulus, flexural strength, flexural modulus or creep property.
2. thermal properties such as heat distortion temperature,
3. chemical properties such as adhesion, printability, flame resistance or weatherability,
4. moldability such as dimensional stability, mold shrinkage, flowability, stretchability or rollability,
5. processability such as no-discoloring or no-foaming.

In the above properties, the improvement in impact resistance (represented by Izod impact strength), rigidity (represented by flexural modulus and flexural strength) and processability are particularly remarkable.

Further, the thermoplastic material compositions of this invention may additionally contain such stabilizers, plasticizers, crosslinking agents, dyestuffs, pigments, thickening agents, antistatic agents or flame retardants as do not detract their desirable characteristics.

The compositions of the present invention have a wide range uses, e.g. in making molded articles by compression-molding, extrusion-molding, blow-molding, injection-molding, thermoforming, rotational-molding, calendering, foam-processing, stretching or casting.

The metal carbonates, hydroxides, oxides and unsaturated aliphatic or aromatic carboxylic acid can be industrially obtained in large quantities at a low price and the mixing or pre-mixing apparatuses used in this invention are also conventional inexpensive equipments. Further, the procedure to prepare the compositions of the present invention is very simple. The compositions of the present invention and molded articles made therefrom are inexpensive and exhibit uniform properties.

The following examples will serve to illustrate this invention more fully and practically.

EXAMPLE 1

The reaction between 10Kg. of heavy calcium carbonate having a number average particle diameter of $1.0\mu$, a maximum particle diameter of $10\mu$, a water content of 0.2 percent by weight and a specific surface area of 4m2/g. and 200g. of acrylic acid was effected by strring at 110°C. for 20 minutes using a 75 liter highspeed agitator at a rotating rate of 860 r.p.m. while introducing therein a small amount of dry air, to give reactive calcium carbonate filler. During the reaction the evolved steam or water and carbon dioxide were removed in the gaseous form from the agitator.

The resulting reactive calcium carbonate was nonpasty dry powder free from the odor of acrylic acid.

Polyethylene having a density of 0.97 and a melt index of 5.0 and the reactive calcium carbonate were well melt-mixed in the proportion set forth in Table 1 using a 1.8 liter Bunbury mixer at a rotating rate of 100 r.p.m. and at a floating rate of 4.0 Kg./cm. for 3 minutes at a temperature of the polyethylene of 230°C. and then the resulting mixture was formed into a sheet with a pair of mixing rollers having a diameter of 8 inches and pelletized. The pellets so obtained were compression-molded and various properties of the resulting molded articles were measured and the results are set forth in Table 1. On the other hand, the pellets were injection molded. The surface of the resulting molded article was smooth and neither discolored nor foamed.

REFERENCE 1–1

10 Kg. of the same heavy calcium carbonate as in Example 1 were suspended in 40 l. of water and 200 g. of acrylic acid were gradually added thereto at 20'C. with stirring and the stirring was continued until foaming was ceased. Then the resulting suspension solution was filtired and the filtrate was washed with water, dried at 80°C. and pulverized. The calcium carbonate so obtained was non-viscous dry powder free from the odor of acrylic acid.

In the same manner as in Example 1, there was obtained a molded article using 30 parts by weight of the same polyethylene as in Example 1 and 70 parts by weight of the resulting calcium carbonate. The properties of the molded article were measured and are shown in Table 1.

REFERENCE 1–2

10 Kg. of calcium oxide on sale were treated with 50 l. of water at about 10°C. to form calcium hydroxide and the resulting calcium hydroxide was reacted with 200 g. of acrylic acid at 80°C. for 20 minutes. Into the reaction mixture there was blown carbon dioxide in an amount of about ten times of theory to give a suspension of precipitated calcium carbonate. Then the precipitated calcium carbonate was filtered off, dried at 80°C. and pulverized to give treated calcium having a number average particle diameter of 0.1 $\mu$. and a maximum particle diameter of 0.3 $\mu$.

In the same manner as in Example, 1, there was obtained a molded article using 30 parts by weight of the same polyethylene as in Example 1 and 70 parts by weight of the resulting calcium carbonate. The properties of the molded article were measured and shown in Table 1.

REFERENCE 1–3

10 Kg. of the same heavy calcium carbonate as in Example 1 and 250 g. calcium acrylate were well stirred at 20°C. for 5 minutes using the same high-speed agitator as in Example 1 to give treated inorganic filler.

In the same manner as in Example 1, there was obtained a mold article using 30 parts by weight of the same polyethylene as in Example 1 and 70 parts by weight of the resulting inorganic filler. The properties of the molded article were measured and shown in Table 1.

REFERENCE 1–4

1.26 Kg. of the same heavy calcium carbonate aw in Example 1, 0.54 Kg. of the same polyethylene as in Example 1 and 25.2 g. of acrylic acid were blended in a dry state at 20°C. for 5 minutes using a 5-liter mixer and then the resulting mixture was well melt-mixed in the same manner as in Example 1 to give a polyethylene composition. The resulting composition remarkably foamed and the dispersibility of the calcium carbonate into the composition was much worse than that in Example 1. In the same manner as in Example 1, there was obtained a molded article using the resulting composition and the properties of the molded article shown in Table 1. On the other hand, the pellets were injection-molded and the surface of the resulting molded article was not smooth due to foaming, and discolored.

REFERENCE 1–5 to 9

In the same manner as in Example 1, there were obtained molded articles using the same heavy calcium carbonate as in Example 1 instead of the active calcium carbonate, and the same polyethylene as in Example 1 in a proportion set forth in Table 1. The properties of the molded articles are shown in Table 1.

EXAMPLE 2

In the same manner as in Example 1, there were obtained molded articles using 30 parts by weight of high density polyethylene having a melt index of 1.0 and a density of 0.955, 70 parts of the same reactive calcium carbonate as in Example 1 and a variety of radical generators set forth in Table 2. the properties of the molded articles so obtained are shown in Table 2..

EXAMPLE 3

Example 1, Run No. 3 was repeated except that in the preparation of active inorganic fillers a variety of inorganic compounds were used instead of the heavy calcium carbonate. The properties of the molded articles thus obtained are shown in Table 3.

REFERENCES 3–1 to 16

Example 1, Run No. 3 was repeated except that a variety of inorganic compounds set forth in Table 3 were used instead of the active calcium carbonate. The properties of the molded articles thus obtained are shown in Table 3.

EXAMPLE 4

Example 1, Run No. 3 was repeated except that in the preparation of reactive inorganic fillers, 200g., based on 10 Kg. of calcium carbonate, of a variety of unsaturated carboxylic acids set forth in Table 4 were used instead of the acrylic acid. The properties of the molded articles thus obtained are shown in Table 4.

REFERENCES 4–1 to 3

Example 1, Run No. 3 was repeated except that in the preparation of active inorganic fillers, 200 g., based on 10 Kg. of the calcium carbonate, of a saturated aliphatic carboxylic acid, a higher saturated aliphatic carboxylic acid and a higher saturated aliphatic carboxylic acid were used instead of acrylic acid. The properties of the molded articles thus obtained are shown in Table 4.

EXAMPLE 5

Example 1, Run No. 3 was repeated except that in the preparation of the reactive calcium carbonate the amount of acrylic acid was varied. The properties of the molded articles thus obtained are shown in Table 5.

EXAMPLE 6

Example 1 was repeated except that 30 parts by weight of a variety of polyolefins set forth in Table 6 were used in the presence or absence of a radical generator and the melt-mixing temperature of the polyolefins was varied according to the polyolefins to be used. The properties of the molded articles thus obtained are shown in Table 6.

REFERENCES 6–1 to 3

Example 6 was repeated except that 70 parts by weight of the same heavy calcium carbonate as in Example 1 were used instead of the reactive calcium carbonate. The properties of the molded articles thus obtained as shown in Table 6.

EXAMPLE 7

Example 3, Run No. 9 was repeated except that a variety of polyolefins with or without a radical generator set forth in Table 7 were used and the melt-mixing temperature was varied according to the polyolefins. The properties of the molded articles thus obtained are shown in Table 7.

REFERENCES 7–1 to 3

Example 7 was repeated except that the same magnesium oxide as in Reference No. 3–9 was used instead of the reactive magnesium. The properties of the molded articles thus obtained are shown in Table 7.

EXAMPLE 8

Example 3, Run No. 6 was repeated except that a variety of polyolefins with or without a radical generator set forth in Table 8 were used and the melt-mixing temperature was varied according to the polyolefins. The properties of the molded articles thus obtained are shown in Table 8.

REFERENCES 8–1 to 3

Example 8 was repeated except that the same aluminum hydroxide as in Reference No. 3–6 was used instead of the reactive aluminum hydroxide. The properties of the molded articles thus obtained are shown in Table 8.

EXAMPLE 9

100 g. of heavy calcium carbonate having a number average particle diameter of $1.0\mu$., a maximum particle diameter of $10\mu$., and a specific surface area of 4 $m^2$./g. were suspended in one liter of xylene at 100°C. and thereto 2 g. of acrylic acid were added with stirring and the reaction was continued for 30 minutes. Then the reaction mixture was filtered off and dried at 80°C. for 3 hours under reduced pressure.

In the same manner as in Example 1, a molded article was obtained using 30 parts by weight of the same polyethylene as in Example 1 and 70 parts by weight of the resulting reactive calcium carbonate. The tensile strength of the molded article was 372 Kg./cm$^2$. and the Izod impact strength was 8.3 Kg.-cm./cm. notched.

EXAMPLE 10

500 g. of heavy calcium carbonate having a number average particle diameter of 1.0 $\mu$., a maximum particle diameter of 10 $\mu$., and a specific surface area of 4 $m^2$./g. were placed in a 1.5 liter autoclave and the autoclave was sealed, heated to 120°C. and degassed to a reduced pressure of 30 mm. Hg. Then 10g. of acrylic acid in the vapor was added therein with stirring at a rate of 1,200 r.p.m. The reaction pressure rose and became constant after 5 minutes. After the autoclave was degassed under the reduced pressure the resulting active calcium carbonate was taken out from the autoclave.

In the same manner as in Example 1, a molded article was obtained using 30 parts by weight of the same polyethylene as in Example 1 and 70 parts by weight of the reactive calcium carbonate. The tensile strength of the molded article was 415 Kg./cm$^2$, and the Izod impact strength was 13.7 Kg.-cm./cm. notched.

EXAMPLE 11

Example 3, Run No. 9 was repeated except that in the preparation of reactive inorganic fillers, 400 g., based on 10 Kg. of magnesium oxide, of a variety of unsaturated carboxylic acids set forth in Table 9 were used instead of the acrylic acid. The properties of the molded articles thus obtained are shown in Table 9.

EXAMPLE 12

Example 3, Run No. 6 was repeated except that in the preparation of reactive inorganic fillers, 75 g., based on 10 Kg. of aluminum hydroxide, of a variety of unsaturated carboxylic acids set forth in Table 10 were used instead of the acrylic acid. The properties of the molded articles thus obtained are shown in Table 10.

EXAMPLE 13

The same reactive precipitated calcium carbonate as in Example 3, Run No. 1 and chemically pulverized polycaprolactam powder having an average particle size of about 100 mesh and a number average molecular weight of 20,000 in a proportion set forth in Table 11 were pre-mixed at 20°C. for 5 minutes using a high-speed mixer at a rate of 830 r.p.m. and the resulting mixture was fed into a double screw mixing machine (DSM II/65, made by the Japan Steel Works, Ltd.) and pelletized by extruding at the resin temperature of 230°C. The pellets were injection-molded and various properties of the resulting molded articles are shown in Table 11.

REFERENCES 13–1 to 2

Example 13 was repeated except that precipitated calcium carbonate having a number average diameter of 1.4 $\mu$., a maximum diameter of 10 $\mu$., and a specific surface area of 6 $m^2$./g. was used instead of the reactive precipitated calcium carbonate. The properties of the molded articles so obtained are shown in Table 11.

REFERENCE 13–3

Example 13 was repeated in the absence of the reactive precipitated calcium carbonate. The properties of the molded article are shown in Table 11.

EXAMPLE 14

To 10 Kg. of precipitated calcium carbonate having a number average particle diameter of 1.4µ., a maximum particle diameter of 10µ., and a specific surface area of 6 m²./g. there were added 500 g. of itaconic acid dissolved in ethyl ether and the reaction was effected by stirring at 120°C. for 30 minutes using a 75 liter, high-speed agitator at a rotating rate of 820 r.p.m. while introducing therein dry air of 120°C. to give active calcium carbonate. During the reaction the evolved steam or water and carbon dioxide were removed in the gaseous form from the agitator.

Using the resulting reactive calcium carbonate and chemically pulverized polyhexamethylene adipamide having an average particle size of about 100 mesh and a number average molecular weight of 24,000 there were obtained molded articles in the same manner as in Example 15 except that the resin temperature of 285°C. was used. The properties of the molded articles are shown in Table 12.

REFERENCES 14-1 to 2

Example 14 was repeated except that precipitated calcium carbonate having a number average diameter of 1.4 µ., a maximum diameter of 10 µ., and a specific surface area of 6 m²./g. was used instead of the reactive precipitated calcium carbonate. Various properties of the molded articles thus obtained are shown in Table 12.

REFERENCE 14-3

Example 14 was repeated in the absence of the reactive precipitated calcium carbonate. Various properties of the resulting molded article are shown in Table 12.

EXAMPLE 15

Example 14 was repeated except that the same reactive heavy calcium carbonate as in Example 1 was used. The properties of the molded articles are shown in Table 13.

EXAMPLE 16

Using the same reactive precipitated calcium carbonate as in Example 3. Run No. 1 and polyoxymethylene homopolymer powder having a melt index of 13.0, a $K_{222}$ of 0.05%, and an average particle size of about 200 there were obtained pellets in the same manner as in Example 13 except that the resin temperature of 190°C. was used. The pellets were compressionmolded and various properties of the resulting molded articles are shown in Table 14.

REFERENCES 16-1 to 2

Example 16 was repeated except that precipitated calcium carbonate having a number average diameter of 1.4 µ., a maximum diameter of 10 µ., and a specific surface area of 6 m²./g. was used instead of the reactive precipitated calcium carbonate. Various properties of the molded articles thus obtained are shown in Table 14.

REFERENCE 16-3

Example 16 was repeated in the absence of the active precipitated calcium carbonate. Various properties of the molded article are shown in Table 14.

EXAMPLE 17

Using the same reactive precipitated calcium carbonate as in Example 14 and chemically pulverized polyethylene terephthalate having an average particle size of about 100 mesh, a softening point of 262.4°C. and an intrinsic viscosity of 0.68 at 35°C. there were obtained molded articles in the same manner as in Example 15 except that the resin temperatures of 270°C. was used. Various properties of the molded articles are shown in Table 15.

REFERENCES 17-1 to 2

Example 17 was repeated except that precipitated calcium carbonate having a number average diameter of 1.4 µ., a maximum diameter of 10 µ., and a specific surface area of 6 m²./g. was used instead of the reactive precipitated calcium carbonate. Various properties of the molded articles thus obtained are shown in Table 15.

REFERENCE 17-3

Example 18 was repeated in the absence of the active precipitated calcium carbonate. Various properties of the molded article are shown in Table 15.

EXAMPLE 18

Using the same reactive precipitated calcium carbonate as in Example 3, Run No. 1, the same polyethylene as in Example 1 and styrene-butadiene elastomer having a melt index (E) of 2.6 (trade mark "TUFPRENE AT" made by Asahi Chemical Industry Co., Ltd.) there were obtained molded articles in the same manner as in Example 1. Various properties of the resulting molded articles are shown in Table 16.

EXAMPLE 18, Run No. 6

Example 3, Run No. 1 was repeated except that the ratio of the polyethylene to the reactive inorganic filler was changed. Various properties of the resulting molded articles are shown in Table 16.

REFERENCE 18-1

Example 18, Run No. 6 was repeated except that precipitated carbonate having a number average of 1.4 µ., a maximum diameter of 10 µ. and a specific surface area of 6 m²./g. was used instead of the reactive precipitated calcium carbonate. Various properties of the resulting molded article are shown in Table 16.

REFERENCE 18-2

Example 18, Run No. 2 was repeated except that precipitated carbonate having a number average of 1.4 µ., a maximum diameter of 10 µ., and a specific surface area of 6 m²./g. was used instead of the reactive precipitated calcium carbonate. Various properties of the resulting molded article are shown in Table 16.

REFERENCE 18-3

Example 18, Run No. 5 was repeated except that precipitated carbonate having a number average of 1.4 µ., a maximum diameter of 10. µ and a specific surface area of 6 m²./g. was used instead of the reactive precipitated calcium carbonate. Various properties of the resulting molded article are shown in Table 16.

REFERENCE 18–4

Example 18 was repeated in the absence of the elawtomeric material and the reactive precipitated calcium carbonate. Various properties of the resulting molded article are shown in Table 16.

EXAMPLE 19

Example 18, Run No. 2 was repeated except that a variety of elastomeric materials set forth in Table 17 were used instead of the styrenebutadiene elastomer. Various properties of the resulting molded articles are shown in Table 17.

REFERENCES 19–1 to 5

Example 19 was repeated except that the same precipitate calcium carbonate as in Reference 18–2 was used instead of the reactive precipitated calcium carbonate. Various properties of the resulting molded articles are shown in Table 17.

EXAMPLE 20

Example 18, Run No. 2 was repeated except that in the preparation of reactive inorganic fillers a variety of inorganic compounds set forth in Table 18 were used instead of the reactive precipitated calcium carbonate. Various properties of the resulting molded articles are shown in Table 18.

REFERENCES 20–1 to 4

Example 20 was repeated except that a variety of inorganic compounds set forth in Table 18 were used instead of the reactive precipitated calcium carbonate. Various properties of the resulting molded articles are shown in Table 18.

EXAMPLE 21

Example 18, Run No. 2 was repeated except that high density polyethylene having a melt index of 0.3 and a density of 0.953 was used together a variety of radical generators set forth in Table 19. Various properties of the resulting molded articles are shown in Table 19.

EXAMPLE 22

Example 18, Run No. 2 was repeated except that a variety of polyolefins with or without a radical generator set forth in Table 20 were used and the melt-mixing temperature of the polyolefins was varied according to the polyolefins. Various properties of the resulting molded articles are shown in Table 20.

REFERENCES 22–1 to 3

Example 22 was repeated except that precipitated calcium carbonate having a number average of 1.4μ., a maximum diameter of 10μ. and a specific surface area of 6 m²./g. was used instead of the active precipitated calcium carbonate. Various properties of the resulting molded articles are shown in Table 20.

Example 23

| Composition (I) | Parts by weight |
|---|---|
| (a) The same reactive heavy calcium carbonate as in Example 1, Run No. 1 | 200 |
| (b) Polyvinylchloride having an average degree of polymerization of 1050 (Trade mark "GEON 103FP" made by Japanese Geon Co.) | 100 |
| (c) Dioctylphthalate | 10 |

Example 23-continued

| Composition (I) | Parts by weight |
|---|---|
| (d) Tricresylphosphate | 20 |
| (e) Chlorinated paraffin | 10 |
| (f) Lead stearate | 1 |
| (g) White lead | 2 |
| (h) Dicumyl peroxide | 0.03 |

The above composition was melt-mixed at the resin temperature of 175°C, using a Bunbury mixer and pelletized. The pellets so obtained were compression-molded at 160°C, for 20 minutes under a pressure of 100 Kg./cm² to produce test pieces having a thickness of 3 mm. Various properties of the resulting test pieces are shown in Table 21.

The chlorine content in ashes after burning the pieces to ashes is measured by mixing the ashes with low pressure polyethylene powder, mixing the mixture with a pair of mixing rollers to form samples and subjecting the resulting samples to X-ray fluorescene analysis. The composition is noninflammable and hydrogen chloride gas is almost captured in ashes.

REFERENCE 23–1

Example 23 was repeated except that heavy calcium carbonate having a number average particle diameter of 1.0 μ., a maximum diameter of 10 μ., and a specific area of 6 m²/g. was used instead of the reactive heavy calcium carbonate. Various properties of the molded sample are shown in Table 21.

REFERENCE 23-2

Example 23 was repeated in the absence of the reactive heavy calcium carbonate. Various properties of the molded sample are shown in Table 21.

EXAMPLE 24

The reaction between 10 Kg. of precipitated calcium carbonate having a number average particle diameter of 0.04 μ., a maximum diameter of 0.1 μ. and a specific surface area of 30 m²/g. and a 1.0 Kg. of acrylic acid was effected in the same manner as in Example 1.

| Composition (II) | parts by weight |
|---|---|
| (a) The reactive precipitated calcium carbonate thus obtained. | 100 |
| (b) Polyvinylchloride having an average degree of polymerization of 1450. (Trade mark "GEON 101EP" made by Japanese Geon Co.) | 100 |
| (c) Dioctylphthalate | 10 |
| (d) Cresyldiphenyl phosphate | 50 |
| (e) Epoxy plasticizer | 3 |
| (g) Tribasic lead sulfate | 5 |
| (h) Dibasic lead phosphite | 5 |
| (i) High-melting paraffin | 0.5 |

Example 23 was repeated except that the composition (II) abovedescribed was used instead of the composition (I). Various properties of the resulting molded sample are shown in Table 22.

EXAMPLE 25

Example 23 was repeated except that in the preparation of reactive inorganic fillers carbonate a variety of inorganic compounds set forth in Table 23 were used instead of heavy calcium carbonate. Various properties of the resulting molded samples are shown in Table 23.

REFERENCES 25-1 to 5

Example 25 was repeated except that a variety of inorganic compounds set for in Table 23 were used instead of the reactive inorganic fillers. Various properties of the resulting molded samples are shown in Table 23.

EXAMPLE 26

5 Kg. of the same heavy calcium carbonate as in Example 10 were placed in a 70-liter ribbon blender and 100 g. of acrylic acid were sprayed thereto with stirring and the resulting mixture was mixed for 2 hours at room temperature.

In the same manner as in Example 1, a molded article was obtained using 30 parts by weight of the same polyethylene as in Example 1 and 70 parts by weight of the resulting reactive heavy calcium carbonate. The tensile strength of the molded article was 386 Kg./cm$^2$.

and the Izod inpact strength was 9.7 Kg.-cm./cm. notched.

In the following tables which set out the results of the test on the shaped structures of the foregoing examples, the properties were measured as follows:

| | |
|---|---|
| Tensile strength | ASTM D638 |
| Tensile elongation | ASTM D638 |
| Flexural modulus | ASTM D790 |
| Flexural strength | ASTM D790 |
| Flexure at break | ASTM D790 |
| Izod impact strength | ASTM D256 |
| Heat distortion temperature | ASTM D648 |
| Oxygen index | ASTM D2863 |
| Flame resistance | UL Standard Subject 94 |

Chlorine content in ashes calculated as HCl ......
HCl content captured in ashes after heating a sample at 700°C. for 30 minutes in dry air
Specific surface area
Measured according to the method by S. Brunaner, P. H. Emmett, E. Teller, Joural of American Chemical Society, Vol. 60, p. 309 (1938).

Table 1

| | Inorganic filler | | Composition | | Properties of composition | | | | |
|---|---|---|---|---|---|---|---|---|---|
| Run No. | Unsaturated Carboxilic acid | Amount of unsaturated carboxylic acid per 100g. of calcium carbonate (g.) | Polyethylene (Parts by weight) | Inorganic filler (Parts by weight) | Tensile strength (Kg./cm$^2$) | Tensile elongation (%) | Izod impact strength (Kg.-cm./cm notched) | Flexural modulus (Kg./cm$^2$) | Heat distortion temperature (264 p.s.i. °C) |
| 1 | acrylic acid | 2.0 | 10 | 90 | —* | —* | —* | —* | —* |
| 2 | do. | do. | 20 | 80 | 461 | 2 | 15.0 | 82200 | 98 |
| 3 | do. | do. | 30 | 70 | 440 | 4 | 16.9 | 77400 | 96 |
| 4 | do. | do. | 50 | 50 | 398 | 10 | 15.5 | 45000 | 68 |
| 5 | do. | do. | 70 | 30 | 355 | 40 | 13.0 | 30500 | 55 |
| 6 | do. | do. | 80 | 20 | 292 | 60 | 10.2 | 27100 | 53 |
| Reference 1-1 | acrylic | 2.0 | 30 | 70 | 182 | 0 | 1.9 | —** | 94 |
| 1-2 | do. | 2.0 | 30 | 70 | 196 | 0.1 | 3.2 | —** | 95 |
| 1-3 | calcium acrylate | 2.5 | 30 | 70 | 163 | 0 | 2.0 | —** | 94 |
| Reference 1-4 | acrylic acid | 2.0 | 30 | 70 | 372 | 1 | 7.9 | 75300 | 96 |
| 1-5 | — | — | 100 | — | 310 | 100 | 6.5 | 13900 | 50 |
| 1-6 | — | — | 70 | 30 | 255 | 1.0 | 1.7 | 31000 | 53 |
| 1-7 | — | — | 50 | 50 | 221 | 0.2 | 1.5 | —** | 66 |
| 1-8 | — | — | 30 | 70 | 133 | 0 | 1.2 | —** | 94 |
| 1-9 | — | — | 20 | 80 | 110 | 0 | 1.1 | —** | 96 |

*The reactive inorganic filler could not be incorporated with the polyethylene.
**Flexural modulus could not be measured due to fragility of the molded article.

Table 2

| | Radical generator | | | Properties of composition | |
|---|---|---|---|---|---|
| Run No. | Kind | | Parts by weight | Tensile strength (Kg./cm$^2$.) | Izod impact strength (Kg.-cm./cm. notched) |
| 1 | Dibutyl tin oxide | | 0.05 | 403 | 22.5 |
| 2 | 2,5-Dimethyl-2,5-di(t-butyl peroxy)hexane | | 0.01 | 420 | 28.3 |
| 3 | Dicumyl peroxide | | 0.02 | 402 | 24.6 |
| 4 | 2,5-Dimethyl-2,5-di(t-butyl peroxy)hexyne-3 | | 0.01 | 425 | 27.6 |
| 5 | Lauroyl peroxide | | 0.02 | 416 | 20.3 |
| 6 | none | | 0 | 385 | 7.8 |

Table 3

| Run No. | Inorganic filler Kind | Particle diameter Number average (μ.) | Particle diameter Maximum (μ.) | Specific surface area (m²./g.) | Acrylic acid Amount per 100g. of inorganic filler (g.) | Properties of composition Tensile strength (Kg./cm².) | Properties of composition Izod impact strength (Kg.-cm./cm. notched) |
|---|---|---|---|---|---|---|---|
| 1 | Precipitated calcium carbonate | 1.4 | 10 | 6.0 | 3.0 | 428 | 14.5 |
| 2 | Basic magnesium carbonate | 0.4 | 1 | 6.3 | 3.2 | 425 | 18.0 |
| 3 | Barium carbonate | 1.2 | 10 | 4.0 | 2.0 | 410 | 10.2 |
| 4 | Strontium carbonate | 1.2 | 10 | 3.5 | 1.8 | 375 | 8.9 |
| 5 | Magnesium hydroxide | 2.5 | 10 | 2.0 | 1.0 | 392 | 9.8 |
| 6 | Aluminum hydroxide | 8.0 | 15 | 1.5 | 0.75 | 370 | 9.2 |
| 7 | Calcium hydroxide | 1.0 | 5 | 4.0 | 2.0 | 335 | 7.4 |
| 8 | Aluminum oxide monohydrate | 2.0 | 15 | 1.5 | 0.75 | 360 | 7.2 |
| 9 | Magnesium oxide | 2.0 | 15 | 4.0 | 3.00 | 395 | 12.8 |
| 10 | Calcium oxide | 2.0 | 30 | 3.6 | 2.70 | 392 | 12.0 |
| 11 | Zinc oxide | 2.0 | 10 | 2.5 | 1.88 | 375 | 13.8 |
| 12 | Beryllium oxide | 8.0 | 20 | 1.2 | 0.90 | 360 | 15.2 |
| 13 | Aluminum oxide | 4.0 | 15 | 1.8 | 1.35 | 355 | 9.4 |
| 14 | Strontium oxide | 1.0 | 10 | 2.5 | 1.88 | 332 | 7.4 |
| 15 | Barium oxide | 3.0 | 20 | 1.2 | 0.90 | 320 | 7.2 |
| 16 | Cadmium oxide | 1.5 | 15 | 2.5 | 1.88 | 344 | 6.8 |
| Reference 3-1 | Precipitated calcium carbonate | 1.4 | 10 | 6 | — | 125 | 1.1 |
| 3-2 | Basic magnesium carbonate | 0.4 | 1 | 6.3 | — | 155 | 1.1 |
| Reference 3-3 | Barium carbonate | 1.2 | 10 | 4.0 | — | 120 | 1.1 |
| 3-4 | Strontium carbonate | 1.2 | 10 | 3.5 | — | 110 | 1.1 |
| 3-5 | Magnesium hydroxide | 2.5 | 10 | 2.0 | — | 135 | 1.2 |
| 3-6 | Aluminum hydroxide | 8.0 | 15 | 1.5 | — | 172 | 1.3 |
| 3-7 | Calcium hydroxide | 1.0 | 5 | 4.0 | — | 105 | 1.1 |
| 3-8 | Aluminum oxide monohydrate | 2.0 | 15 | 1.5 | — | 118 | 1.1 |
| 3-9 | Magnesium oxide | 2.0 | 15 | 4.0 | — | 120 | 1.1 |
| 3-10 | Calcium oxide | 2.0 | 30 | 3.6 | — | 174 | 1.4 |
| 3-11 | Zinc oxide | 2.0 | 10 | 2.5 | — | 156 | 1.1 |
| 3-12 | Beryllium oxide | 8.0 | 20 | 1.2 | — | 128 | 1.1 |
| 3-13 | Aluminum oxide | 4.0 | 15 | 1.8 | — | 140 | 1.3 |
| 3-14 | Strontium oxide | 1.0 | 10 | 2.5 | — | 127 | 1.1 |
| 3-15 | Barium oxide | 3.0 | 20 | 1.2 | — | 127 | 1.1 |
| 3-16 | Cadmium oxide | 1.5 | 15 | 2.5 | — | 116 | 1.1 |

Table 4

| Run No. | Active inorganic filler Unsaturated carboxylic acid | Reaction temperature (°C.) | Properties of composition Tensile strength (Kg./cm².) | Izod impact strength (Kg.-cm./cm. notched) |
|---|---|---|---|---|
| 1 | Methacrylic acid | 110 | 395 | 10.3 |
| 2 | Crotonic acid | 110 | 392 | 9.6 |
| 3 | Sorbic acid[1] | 130 | 375 | 8.3 |
| 4 | Maleic acid[1] | 130 | 369 | 7.4 |
| 5 | Vinylacetic acid | 110 | 290 | 4.6 |
| 6 | Styrylacrylic acid[1] | 130 | 364 | 5.8 |
| 7 | Alpha-ethyl acrylic acid | 120 | 351 | 7.8 |
| 8 | Angelic acid | 130 | 295 | 5.3 |
| 9 | Alpha-chloro acrylic acid | 80 | 320 | 7.2 |
| 10 | Vinyl glycolic acid | 80 | 295 | 6.8 |
| Reference 4-1 | Propionic acid | 110 | 194 | 1.6 |
| 4-2 | Stearic acid[2] | 150 | 160 | 1.4 |
| 4-3 | Linoleic acid[2] | 150 | 188 | 1.8 |

Note:
[1] Used as a 60 % ethyl ether solution
[2] Used in the form of powder

Table 5

| Run No. | Acrylic acid Amount per 100g. of calcium carbonate (g.) | Tensile strength (Kg./cm².) | Izod impact strength (Kg.-cm./cm. notched) |
|---|---|---|---|
| 1 | 0.1 | 283 | 3.6 |
| 2 | 0.5 | 410 | 12.1 |
| 3 | 2.0 | 440 | 16.9 |
| 4 | 5.0 | 430 | 15.2 |
| 5 | 15.0 | 392 | 10.1 |

Table 5-continued

| Run No. | Acrylic acid Amount per 100g. of calcium carbonate (g.) | Tensile strength (Kg./cm².) | Izod impact strength (Kg.-cm./cm. notched) |
|---|---|---|---|
| Reference 5-1 | 0 | 133 | 1.2 |

Note: *) The molded article discolored to be brownish in the appearance and foamed.

Table 6

| Run No. | Polyolefin | Composition Melt-mixing temperature of polyolefin (°C.) | Radical generator (parts by weight) | Tensile strength (Kg./cm².) | Tensile elongation (%) | Properties of composition Izod impact strength (Kg.-cm./cm. notched) | Flexural modulus (Kg./cm².) | Heat distortion temperature (264 p.s.i. °C.) |
|---|---|---|---|---|---|---|---|---|
| 1 | Low density polyethylene 1) | 230 | 2,5-dimethyl-2,5-di(t-butyl peroxy)hexane 0.01 | 244 | 32 | 25 | 35000 | 76 |
| 2 | Polypropylene 2) | 250 | — | 383 | 2 | 7 | 83000 | 105 |
| 3 | Ethylene-propylene block copolymer 3) | 250 | — | 375 | 3 | 8 | 76000 | 103 |
| Reference 6-1 | Low density polyethylene 1) | 230 | 2,5-dimethyl 2,5-di(t-butyl peroxy)hexane 0.01 | 115 | 7 | 2.8 | 35800 | 74 |
| 6-2 | Polypropylene 2) | 250 | — | 150 | 0.01* | 0.8 | —* | 103 |
| 6-3 | Ethylene-propylene block copolymer 3) | 250 | — | 140 | 0.01* | 1.1 | —* | 101 |

Note:
1) Low density polyethylene having a melt index (MI) of 1.6 and a density of 0.92
2) Crystalline polypropylene having a melt flow index (MFI) of 7.8 and a density of 0.91
3) Crystalline ethylene-propylene copolymer containing 20 percent by weight of ethylene and having a MFI of 2.0
* Elongation could not be measured due to fragility of the molded article.

Table 7

| Run No. | Polyolefin | Composition Melt-mixing temperature of polyolefin (°C.) | Radical generator (parts by weight) | Tensile strength (Kg./cm².) | Tensile elongation (%) | Properties of composition Izod impact strength (Kg.-cm./cm. notched) | Flexural modulus (Kg./cm².) | Heat distortion temperature (264 p.s.i. °C.) |
|---|---|---|---|---|---|---|---|---|
| 1 | Low density polyethylene 1) | 230 | 2,5-Dimethyl-2,5-di (t-butyl peroxy) hexane 0.01 | 205 | 50 | 25 | 34000 | 74 |
| 2 | Polypropylene 2) | 250 | — | 390 | 2 | 8 | 79400 | 106 |
| 3 | Ethylene-propylene block copolymer 3) | 250 | — | 370 | 3 | 9 | 74100 | 104 |
| Reference 7-1 | Low density polyethylene 1) | 230 | 2,5-Dimethyl-2,5-di (t-butyl peroxy) hexane 001 | 115 | 7 | 2.8 | 35800 | 74 |
| 7-2 | Polypropylene 2) | 250 | — | 145 | 0.01* | 0.8 | —* | 105 |
| 7-3 | Ethylene-propylene block copolymer 3) | 250 | — | 140 | 0.01* | 1.1 | —* | 102 |

Note:
1) Low density polyethylene having a melt index of 1.6 and a density of 0.92
2) Crystalline polypropylene having a melt flow index of 7.8 and a density of 0.91
3) Crystalline ethylene-propylene copolymer containing 20 percent by weight of ethylene and having a melt flow index of 2.0

Table 8

| Run No. | Polyolefin | Composition Melt-mixing temperature of polyolefin (°C.) | Radical generator (parts by weight) | Tensile strength (Kg./cm².) | Tensile elongation (%) | Properties of composition Izod impact strength (Kg.-cm./cm. notched) | Flexural modulus (Kg./cm².) | Heat distortion temperature (264 p.s.i. °C.) |
|---|---|---|---|---|---|---|---|---|
| 1 | Low density polyethylene 1) | 210 | 2,5-dimethyl-2,5-di(t-butyl)peroxy)hexane 0.01 | 220 | 45 | 27 | 33100 | 71 |

Table 8-continued

| Run No. | Polyolefin | Composition Melt-mixing temperature of polyolefin (°C.) | Radical generator (parts by weight) | Tensile strength (Kg./cm².) | Tensile elongation (%) | Izod impact strength (Kg.-cm./cm. notched) | Flexural modulus (Kg./cm².) | Heat distortion temperature (264 p.s.i. °C.) |
|---|---|---|---|---|---|---|---|---|
| 2 | Polypropylene 2) | 230 | — | 360 | 4 | 7 | 76300 | 102 |
| 3 | Ethylene-propylene block copolymer 3) | 230 | — | 348 | 6 | 8 | 73500 | 100 |
| Reference |  |  |  |  |  |  |  |  |
| 8-1 | Low density polyethylene 1) | 210 | 2,5-(dimethyl 2,5-di(t-butyl 0.01 | 127 | 10 | 3.2 | 33900 | 70 |
| 8-2 | Polypropylene 2) | 230 | — | 146 | 0.01* | 1.4 | — * | 103 |
| 8-3 | Ethylene-propylene block copolymer 3) | 230 | — | 150 | 0.01* | 1.4 | — * | 100 |

Note:
1) Low density polyethylene having a melt index (MI) of 1.6 and a density of 0.92
2) Crystalline polypropylene having a melt flow index (MFI) of 7.8 and a density of 0.91
3) Crystalline ethylene-propylene copolymer containing 20 percent by weight of ethylene and having a MFI of 2.0
* Elongation could not be measured due to fragility of the molded article.

Table 9

| | Reactive inorganic filler | | Properties of composition | |
|---|---|---|---|---|
| Run No. | Unsaturated carboxylic acid | Reaction temperature (°C.) | Tensile strength (Kg./cm².) | Izod impact strength (Kg.-cm./cm. notched) |
| 1 | Methacrylic acid | 110 | 387 | 11.5 |
| 2 | Crotonic acid | 110 | 380 | 8.7 |
| 3 | Sorbic acid 1) | 130 | 375 | 10.0 |

Note: 1) Used as a 60% ethyl ether solution

Table 10

| | Reactive inorganic filler | | Properties of composition | |
|---|---|---|---|---|
| Run No. | Unsaturated carboxylic acid | Reaction temperature (°C.) | Tensile strength (Kg./cm².) | Izod impact strength (Kg.-cm./cm. notched) |
| 1 | Methacrylia acid | 110 | 387 | 10.0 |
| 2 | Crotonic acid | 110 | 365 | 7.5 |
| 3 | Sorbic acid 1) | 130 | 370 | 8.6 |

Note: 1) Used as a 60% ethyl ether solution

Table 11

| | Composition | | Properties of composition | | | |
|---|---|---|---|---|---|---|
| | Polyamide | Inorganic filler | Flexural properties | | | Izod impact strength |
| Run No. | (Parts by weight) | (Parts by weight) | Flexural strength (Kg./cm².) | Flexural modulus (kg./cm².) | Flexure at break (mm.) | (Kg.-cm./cm. notched) |
| 1 | 75 | 25 | 1020 | 37200 | 7.3 | 3.5 |
| 2 | 50 | 50 | 1005 | 48500 | 3.7 | 3.0 |
| Reference |  |  |  |  |  |  |
| 13-1 | 75 | 25 | 430 | —* | —* | 1.3 |
| 13-2 | 50 | 50 | 390 | —* | —* | 1.1 |
| 13-3 | 100 | — | 1090 | 26600 | 10 | 2.9 |

Note:
* Flexural modulus and flexure at break could not be measured due to fragility of the molded article.

Table 12

| | Composition | | Properties of composition | | | |
|---|---|---|---|---|---|---|
| | Polyamide | Inorganic filler | Flexural properties | | | Izod impact strength |
| Run No. | (Parts by weight) | (Parts by weight) | Flexural strength (Kg./cm².) | Flexural modulus (Kg./cm².) | Flexure at break (mm.) | (Kg.-cm./cm. notched) |
| 1 | 75 | 25 | 1040 | 39800 | 7.5 | 4.1 |
| 2 | 50 | 50 | 1210 | 50200 | 2.3 | 3.4 |
| Reference |  |  |  |  |  |  |
| 14-1 | 75 | 25 | 450 | — * | — * | 1.2 |
| 14-2 | 50 | 50 | 385 | — * | — * | 1.0 |
| 14-3 | 100 | — | 1090 | 26600 | 10 | 2.9 |

Note:
* Flexural modulus and flexure at break could not be measured due to fragility of the molded article.

Table 13

| Run No. | Composition Polyamide (Parts by weight) | Composition Inorganic filler (Parts by weight) | Flexural strength (Kg./cm².) | Flexural modulus (Kg./cm².) | Flexure at break (mm.) | Izod impact strength (Kg.-cm./cm. notched) |
|---|---|---|---|---|---|---|
| 1 | 75 | 25 | 1120 | 39800 | 6.4 | 3.9 |
| 2 | 50 | 50 | 1050 | 52000 | 1.8 | 3.2 |
| Reference | | | | | | |
| 15-1 | 75 | 25 | 452 | — * | — * | 1.3 |
| 15-2 | 50 | 50 | 390 | — * | — * | 1.0 |
| 15-3 | 100 | — | 1090 | 26600 | 10 | 2.9 |

Note:
* Flexural modulus and flexure at break could not be measured due to fragility of the molded article.

Table 14

| Run No. | Composition Polyacetal (Parts by weight) | Composition Inorganic filler (Parts by weight) | Flexural strength (Kg./cm².) | Flexural modulus (Kg./cm².) | Flexure at break (mm.) | Izod impact strength (Kg.-cm./cm. notched) |
|---|---|---|---|---|---|---|
| 1 | 75 | 25 | 1062 | 44700 | 21 | 4.2 |
| 2 | 50 | 50 | 920 | 61000 | 5 | 3.2 |
| Reference | | | | | | |
| 16-1 | 75 | 25 | 425 | — * | — * | 1.1 |
| 16-2 | 50 | 50 | 306 | — * | — * | 1.1 |
| 16-3 | 100 | — | 1050 | 36100 | 30 | 5.0 |

Note:
* Flexural modulus and flexure at break could not be measured due to fragility of the molded article.

Table 15

| Run No. | Composition Polyethylene-terephthalate (Parts by weight) | Composition Inorganic filler (Parts by weight) | Flexural strength (Kg./cm².) | Flexural modulus (Kg./cm².) | Flexure at break (mm.) | Izod impact strength (Kg-cm./cm. notched) |
|---|---|---|---|---|---|---|
| 1 | 75 | 25 | 1120 | 44200 | 6.0 | 3.1 |
| 2 | 50 | 50 | 1070 | 68700 | 2.0 | 2.8 |
| Reference | | | | | | |
| 17-1 | 75 | 25 | 430 | — * | — * | 1.1 |
| 17-2 | 50 | 50 | 365 | — * | — * | 1.0 |
| 17-3 | 100 | — | 1020 | 28100 | 10 | 1.8 |

Note:
* Flexural modulus and flexure at break could not be measured due to fragility of the molded article.

Table 16

| Run No. | Polyethylene (Parts by weight) | Elastomeric material (Parts by weight) | Reactive inorganic filler (Parts by weight) | Flexural strength (Kg./cm².) | Flexural modulus (Kg./cm².) | Flexure at break (mm.) |
|---|---|---|---|---|---|---|
| 1 | 27 | 3 | 70 | 785 | 67200 | 6.2 |
| 2 | 24 | 6 | 70 | 710 | 57300 | 12.5 |
| 3 | 21 | 9 | 70 | 625 | 41000 | 20.7 |
| 4 | 15 | 15 | 70 | 483 | 27500 | 28.6 |
| 5 | 40 | 10 | 50 | 371 | 28300 | 30 |
| Example 3. | | | | | | |
| Run No.1 | 30 | — | 70 | 905 | 78200 | 3.4 |
| 6 | 50 | — | 50 | 425 | 30900 | 18.0 |
| Reference | | | | | | |
| 3-1 | 30 | — | 70 | 309 | — * | — * |
| 18-1 | 50 | — | 50 | 216 | — * | — * |
| 18-2 | 24 | 6 | 70 | 325 | 40100 | 1.6 |
| 18-3 | 40 | 10 | 50 | 254 | 27800 | 6.0 |
| 18-4 | 100 | — | — | 337 | 13900 | 30 |

Note:
* Flexural modulus and flexure at break could not be measured due to fragility of the molded article.

Table 17

| Run No. | Elastomeric material | Flexural strength (Kg./cm².) | Flexural modulus (Kg./cm².) | Flexure at break (mm.) |
|---|---|---|---|---|
| 1 | Butadiene rubber (BR) 1) | 547 | 36000 | 15.4 |
| 2 | Styrene-butadiene rubber (SBR) 2) | 521 | 35800 | 17.4 |

Table 17-continued

| Run No. | Elastomeric material | Flexural strength (Kg./cm².) | Flexural modulus (Kg./cm².) | Flexure at break (mm.) |
|---|---|---|---|---|
| 3 | Butyl rubber (IIR) 3) | 464 | 43700 | 6.8 |
| 4 | Ethylene-propylene rubber (EPR) 4) | 562 | 41200 | 14.5 |
| 5 | Ethylene-vinylacetate copolymer (EVA) 5) | 725 | 59600 | 8.9 |
| Reference | | | | |
| 19-1 | Butadiene rubber (BR) 1) | 246 | 27100 | 1.6 |
| 19-2 | Styrene-butadiene rubber (SBR) 2) | 247 | 29300 | 2.2 |
| 19-3 | Butyl rubber (IIR) 3) | 209 | 41100 | 0.8 |
| 19-4 | Ethylene-propylene rubber (EPR) 4) | 253 | 37800 | 1.5 |
| 19-5 | Ethylene-vinylacetate copolymer (EVA) 5) | 347 | 46100 | 1.7 |

Note:
1) Trade mark "DIENE NF 35" made by Asahi Chemical Industry Co., Ltd.
2) Trade mark "TUFDENE 2000" made by Asahi Chemical Industry Co., Ltd.
3) Trade mark "ESSO BUTYL 035" made by Esso Standard Oil
4) Trade mark "NORDEL" made by E.I. Du Pont De Nemours & Co.
5) Trade mark "EVAFLEX 360" made by Mitsui Polychemical Co., Ltd.

Table 18

| Run No. | Inorganic filler (70 parts by weight) | | | | Amount of acrylic acid * (g.) | Elastomeric material (Parts by weight) | Polyethylene (Parts by weight) | Properties of composition | | |
|---|---|---|---|---|---|---|---|---|---|---|
| | Kind | Particle diameter Number average (μ.) | Maximum (μ.) | Specific surface area (m²./g.) | | | | Flexural strength (Kg./cm².) | Flexural modulus (Kg./cm².) | Flexure at break (mm.) |
| 1 | Heavy calcium carbonate | 1.8 | 10 | 2.5 | 1.68 | 6 | 24 | 688 | 52700 | 10.4 |
| 2 | Basic magnesium carbonate | 0.4 | 1 | 6.3 | 4.22 | 6 | 24 | 940 | 83400 | 7.6 |
| 3 | Aluminum hydroxide | 8.0 | 15 | 1.5 | 1.00 | 6 | 24 | 575 | 71800 | 30 |
| 4 | Calcium oxide | 2.0 | 30 | 3.6 | 2.70 | 6 | 24 | 710 | 69600 | 30 |
| 5 | Heavy calcium carbonate | 1.8 | 10 | 2.5 | 1.68 | — | 30 | 860 | 78500 | 2.2 |
| 6 | Basic magnesium carbonate | 0.4 | 1 | 6.3 | 4.22 | — | 30 | 1010 | 92000 | 0.8 |
| 7 | Aluminum hydroxide | 8.0 | 15 | 1.5 | 1.00 | — | 30 | 618 | 82200 | 6.7 |
| 8 | Calcium oxide | 2.0 | 30 | 3.6 | 2.70 | — | 30 | 725 | 80600 | 5.8 |
| Reference | | | | | | | | | | |
| 20-1 | Heavy calcium carbonate | 1.8 | 10 | 2.5 | — | — | 30 | 335 | —** | —** |
| 20-2 | Basic magnesium carbonate | 0.4 | 1 | 6.3 | — | — | 30 | 237 | —** | —** |
| 20-3 | Aluminum hydroxide | 8.0 | 15 | 1.5 | — | — | 30 | 300 | 84100 | 0.5 |
| 20-4 | Calcium oxide | 2.0 | 30 | 3.6 | — | — | 30 | 472 | 73600 | 1.5 |

Note:
* Amount of acrylic acid per 100g. of the inorganic filler
** Flexural strength and flexural modulus could not be measured due to fragility of the molded article.

Table 19

| Run No. | Radical generator | | Flexural properties of composition | | |
|---|---|---|---|---|---|
| | Kind | Parts by weight | Flexural strength (Kg./cm².) | Flexural modulus (Kg./cm².) | Flexure at break (mm.) |
| 1 | Dibutyl tin oxide | 0.05 | 702 | 44000 | 17 |
| 2 | 2,5-Dimethyl-2,5-di(t-butylperoxy)hexane | 0.01 | 685 | 47800 | 24 |
| 3 | Dicumyl peroxide | 0.02 | 640 | 43500 | 20 |
| 4 | none | 0 | 496 | 34400 | 7 |

Table 20

| Run No. | Polyolefin | Composition Melt-mixing temperature of polyolefin (°C.) | Radical generator (Parts by weight) | Flexural strength (Kg./cm².) | Flexural modulus (Kg./cm².) | Flexure at break (mm.) |
|---|---|---|---|---|---|---|
| 1 | Low density polyethylene 1) | 230 | 2,5-dimethyl-2,5-di(t-butyl peroxy)hexane 0.01 | 220 | 30200 | 19.7 |
| 2 | Polypropylene 2) | 240 | — | 711 | 66500 | 8.6 |
| 3 | Ethylene-propylene block copolymer 3) | 250 | — | 670 | 62000 | 10.0 |
| Reference 22-1 | Low density polyethylene 1) | 230 | 2,5-dimethyl-2,5-di(t-butyl peroxy)hexane 0.01 | 134 | 28500 | 3.2 |
| 22-1 | Polypropylene 2) | 240 | — | 365 | 59400 | 0.8 |
| 22-3 | Ethylene-propylene block copolymer 3) | 250 | — | 370 | 54700 | 1.1 |

Note:
1) The same low density polyethylene as in Example 6 was used.
2) The same polypropylene as in Example 6 was used.
3) The same ethylene-propylene block copolymer as in Example 6 was used.
*) Flexural strength and flexural modulus could not be measured due to fragility of the molded article.

Table 21

| Run No. | Properties of composition Tensile strength (Kg./cm².) | Tensile elongation (%) | Inflammability Oxygen index (%) | Flame resistance | Chlorine content in ash calculated as HCl |
|---|---|---|---|---|---|
| 1 | 370 | 120 | 29 | SE-O | 90 |
| Reference 23-1 | 125 | 60 | 29 | SE-O | 90 |
| 23-2 | 176 | 320 | 34 | SE-O | 5 |

Table 22

| Run No. | Properties of composition Tensile strength (Kg./cm².) | Tensile elongation (%) | Inflammability Oxygen index (%) | Flame resistance | Chlorine content in ash calculated as HCl |
|---|---|---|---|---|---|
| 1 | 180 | 270 | 28 | SE-O | 100 |
| Reference 24-1 | 110 | 190 | 28 | SE-O | 100 |

Table 23

| Run No. | Inorganic filler Kind | Number average particle diameter (μ.) | Maximum particle diameter (μ.) | Specific surface area (m²./g.) | Amount of acrylic acid * (g.) | Properties of composition Tensile strength (Kg./cm.) | elongation (%) | Inflammability Oxygen index (%) | Flame resistance | Chlorine content in ash |
|---|---|---|---|---|---|---|---|---|---|---|
| 1 | Basic magnesium carbonate | 0.4 | 0.8 | 6.3 | 4.22 | 290 | 60 | 30 | SE-O | 90 |
| 2 | Magnesium hydroxide | 1.0 | 10 | 8.2 | 5.47 | 200 | 120 | 31 | SE-O | 76 |
| 3 | Calcium oxide | 2.0 | 30 | 3.6 | 2.70 | 180 | 140 | 29 | SE-O | 70 |
| 4 | Cadmium carbonate | 0.8 | 5 | 6.0 | 4.00 | 220 | 70 | 30 | SE-O | 78 |
| 5 | Aluminum hydroxide | 1.2 | 10 | 4.0 | 2.70 | 250 | 160 | 29 | SE-O | 42 |
| Reference 25-1 | Basic magnesium carbonate | 0.4 | 0.8 | 6.3 | — | 140 | 30 | 30 | SE-O | 90 |
| 25-2 | Magnesium hydroxide | 1.0 | 10 | 8.2 | — | 105 | 40 | 31 | SE-O | 76 |
| 25-3 | Calcium oxide | 2.0 | 30 | 3.6 | — | 85 | 40 | 29 | SE-O | 70 |
| 25-4 | Cadmium carbonate | 0.8 | 5 | 6.0 | — | 100 | 30 | 30 | SE-O | 78 |
| 25-5 | Aluminum | 1.2 | 10 | 4.0 | — | 105 | 30 | 29 | SE-O | 42 |

Note: * Amount of acrylic acid per 100 g. of the inorganic filler

It will be appreciated that the instant specification and examples are set forth by way of illustration and not limitation and the various modifications and changes may be made without departing the spirit and scope of the present invention.

What is claimed is:

1. A thermoplastic material composition comprising (A) about 15 to 90 percent by weight of thermoplastic material and (B) about 85 to 10 percent by weight of at least one reactive inorganic filler,
   said reactive filler having been prepared by effecting reaction between a mixture consisting essentially of
   a. an inorganic material substantially comprising at least one compound selected from the group consisting of metal carbonates, metal hydroxides and metal oxides, said metal being selected from the group consisting of beryllium, magnesium, calcium, barium, zinc, cadmium and aluminum, said compound having a number average particle diameter of about 10 $\mu$, and
   b. at least one unsaturated aliphatic or aromatic carboxylic acid having from 3 to 11 carbon atoms, one or two ethylenic unsaturations, and one or two carboxylic groups the proportion of said unsaturated aliphatic or aromatic carboxylic acid being from about 0.05 to 20 percent by weight of the total weight of said inorganic material,
   with stirring and removal of water from the reaction system at a temperature up to the temperature at which said aliphatic or aromatic carboxylic acid begins to decompose.

2. The process of claim 2 wherein the reaction between said thermoplastic material and said reactive inorganic filler is carried out in the presence of from about 0.001 to about 0.1 percent by weight, based on the total weight of the composition, of a radical generator.

3. The process of claim 2 wherein said inorganic material is selected from the group consisting of calcium carbonate, magnesium carbonate, strontium carbonate, barium carbonate, beryllium oxide, magnesium oxide, calcium oxide, strontium oxide, barium oxide, zinc oxide, cadmium oxide, aluminum oxide, aluminum oxide hydrate, magnesium hydroxide, calcium hydroxide and aluminum hydroxide.

4. The process of claim 2 wherein said aliphatic or aromatic carboxylic acid is selected from the group consisting of acrylic acid, methacrylic acid, alpha-ethylacrylic acid, alpha-chloroacrylic acid, crotonic acid, sorbic acid, maleic acid, itaconic acid, vinylacetic acid, vinylglycolic acid, angelic acid and styrylacrylic acid.

5. The process of claim 2 wherein said thermoplastic material is selected from the group consisting of polyolefin, polyamide, polyester, polyacetal, polyvinylchloride, and mixtures of the polyolefin and elastomeric material.

6. A process for preparing a thermoplastic material composition which comprises effecting reaction between (A) about 15 to 90 percent by weight of thermoplastic material and (B) about 85 to 10 percent by weight of at least one reactive inorganic filler,
   said reactive inorganic filler having been prepared by effecting reaction between a mixture consisting essentially of
   a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$ to about 50 $\mu$ and a maxiumum particle diameter of about 100 $\mu$, and
   b. at least one unsaturated aliphatic or aromatic carboxylic acid having from 3 to 11 carbon atoms, one or two ethylenic unsaturations and one or two carboxyl groups, the proportion of said unsaturated aliphatic or aromatic carboxylic acid being from about 0.05 to 20 percent by weight of the total weight of said inorganic material,
   with stirring and removal of water from the reaction system at a temperature up to the temperature at which said aliphatic or aromatic carboxylic acid begins to decompose,
   in a melt with mixing at a temperature of from about 120°C to about 300°C.

7. The process of claim 6 wherein said polyolefin is polyethylene.

8. The process of claim 6 wherein said polyolefin is polypropylene.

9. The process of claim 6 wherein said polyolefin is a copolymer of ethylene and propylene.

10. The process of claim 1 wherein said inorganic material is calcium carbonate.

11. A thermoplastic material composition comprising (A) about 15 to 90 percent by weight of polyolefin and (B) about 85 to 10 percent by weight of at least one reactive inorganic filler having been prepared by effecting reaction between a mixture consisting essentially of
   a. an inorganic material substantially comprising at least one compound selected from the group consisting of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$ to about 50 $\mu$ and a maximum particle diameter of about 100 $\mu$, and
   b. at least one unsaturated aliphatic carboxylic acid having from 3 to 11 carbon atoms, one or two ethylenic unsaturations and one or two carboxylic groups, the proportion of said unsaturated aliphatic or aromatic carboxylic acid being from about 0.05 to 20 percent by weight of the total weight of said inorganic material,
   with stirring and removal of water from the reaction system at a temperature up to the temperature at which said aliphatic or aromatic carboxylic acid begins to decompose.

12. The process of claim 1 wherein said acid is acrylic acid.

13. The process of claim 6 wherein said polyolefin is a mixture of about 95 to 40 percent by weight of polyolefin and about 5 to 60 percent of elastomeric material.

14. The process of claim 13 wherein said elastomeric material is selected from the group consisting of butadiene rubber, styrene-butadiene rubber, styrene-butadiene block copolymer, ethylene-propylene rubber and ethylene-vinylacetate copolymer.

15. The process of claim 6 wherein the amount of said polyolefin is 15 to 80 percent by weight and the amount of said reactive inorganic filler is 85 to 20 percent by weight.

16. The process of claim 6 wherein the amount of said polyolefin is 30 to 50 percent by weight and the amount of said reactive inorganic filler is 70 to 50 percent by weight.

17. The process of claim 1 wherein said thermoplastic material is polyamide, the inorganic material is calcium carbonate, the unsaturated acid is acrylic acid or itaconic acid, stirring being conducted with removal of the evolved carbon dioxide at a temperature from about 10° to 200°C.

18. The process of claim 17 wherein the amount of said polyamide is 20 to 90 percent by weight and the amount of said reactive inorganic filler is 80 to 10 percent by weight.

19. The process of claim 17 wherein the amount of said polyamide is 50 to 20 percent by weight and the amount of said reactive inorganic material is 50 to 80 percent by weight.

20. The process of claim 17 wherein said polyamide is polycaprolactam.

21. The process of claim 17 wherein said polyamide is polyhexamethylene adipamide.

22. The process of claim 1 wherein said thermoplastic material is polyacetal, said inorganic material is calcium carbonate and said unsaturated acid is acrylic acid, and the polyacetal comprises about 90 to 30 percent by weight and the reactive inorganic filler about 10 to 70 percent by weight, stirring being conducted with removal of the evolved carbon dioxide at a temperature of from about 10° to 200°C.

23. The process of claim 22 wherein said polyacetal is polyoxymethylene.

24. The process of claim 1 wherein said thermoplastic material is polyester, said inorganic material is calcium carbonate and said unsaturated acid is acrylic acid, and the polyacetal comprises about 90 to 30 percent by weight and the reactive inorganic filler about 10 to 70 percent by weight, stirring being conducted with removal of the evolved carbon dioxide at a temperature from about 10° to 200°C.

25. The process of claim 24 wherein the amount of the polyester is 50 to 80 percent by weight and the amount of the reactive inorganic filler is 50 to 20 percent by weight.

26. The process of claim 24 wherein the polyester is polyethylene terephthalate.

27. The process of claim 1 wherein said thermoplastic material is polyvinylchloride, said inorganic material substantially comprises at least one compound selected from the group consisting of calcium carbonate, magnesium carbonate, cadmium carbonate, magnesium hydroxide, calcium oxide and aluminum hydroxide, the unsaturated acid is acrylic acid, and the polyvinylchloride comprises about 20 to 90 percent by weight and the reactive inorganic filler about 80 to 10 percent by weight, stirring being conducted with removal of any evolved carbon dioxide at a temperature from about 10° to 200°C.

28. The process of claim 27 wherein said inorganic material is calcium carbonate.

29. The process of claim 27 wherein said polyvinylchloride is polyvinylchloride homopolymer.

30. The process of claim 27 wherein the amount of said polyvinylchloride is 50 to 80 percent by weight and the amount of said reactive inorganic filler is 50 to 20 percent by weight.

31. The product produced by the process of claim 1.
32. The product produced by the process of claim 2.
33. The product produced by the process of claim 6.
34. The product produced by the process of claim 17.
35. The product produced by the process of claim 22.
36. The product produced by the process of claim 24.
37. The product produced by the process of claim 27.

* * * * *

UNITED STATES PATENT AND TRADEMARK OFFICE
CERTIFICATE OF CORRECTION

PATENT NO. : 3,926,873
DATED : December 16, 1975
INVENTOR(S) : Itsuho Aishima et al.

It is certified that error appears in the above-identified patent and that said Letters Patent are hereby corrected as shown below:

Col. 3, line 31, correct spelling of "the".

Col. 6, line 26, after "property" cancel period " . " and substitute -- , -- (comma).

Col. 27, Table 23, Run 25-5, under column headed "Kind"

below "Aluminum" insert -- hydroxide --.

Column 29, correct claim 1 to read as follows:

-- A process for preparing a thermoplastic material composition which comprises effecting reaction between (A) about 15 to 90 percent by weight of thermoplastic material and (B) about 85 to 10 percent by weight of at least one reactive inorganic filler, said reactive organic filler having been prepared by effecting reaction between a mixture consisting essentially of (a) an inorganic material substantially comprising at least one compound selected from the group consisting

UNITED STATES PATENT AND TRADEMARK OFFICE
CERTIFICATE OF CORRECTION PATENT NO. : 3,926,873
DATED : December 16, 1975
INVENTOR(S) : Itsuho Aishima et al It is certified that error appears in the above-identified patent and that said Letters Patent are hereby corrected as shown below:

of metal carbonates, metal hydroxides and metal oxides, said metal being selected from the group consisting of beryllium, magnesium, calcium, strontium, barium, zinc, cadmium and aluminum, said compound having a number average particle diameter of from about 0.01 $\mu$ to about 50 $\mu$ and a maximum particle diameter of about 100 $\mu$, and (b) at least one unsaturated aliphatic or aromatic carboxylic acid having from 3 to 11 carbon atoms, one or two ethylenic unsaturations and one or two carboxyl groups, the proportion of said unsaturated aliphatic or aromatic carboxylic acid being from about 0.05 to 20 percent by weight of the total weight of said inorganic material, with stirring and removal of the evolved water at a temperature at which said aliphatic or aromatic carboxylic acid begins to decompose,

UNITED STATES PATENT AND TRADEMARK OFFICE
CERTIFICATE OF CORRECTION

PATENT NO. : 3,926,873

DATED : December 16, 1975

INVENTOR(S) :

It is certified that error appears in the above-identified patent and that said Letters Patent are hereby corrected as shown below:

in a melt with mixing at a temperature of from about 120°C to about 300°C. --

Col. 29, claim 2, line 1, cancel "2" and substitute -- 1 --.

Col. 29, claim 3, line 1, cancel "2" and substitute -- 1 --.

Col. 29, claim 4, line 1, cancel "2" and substitute -- 1 --.

Col. 29, claim 5, line 1, cancel "2" and substitute -- 1 --.

Col. 29, claim 6, correct to read as follows:

-- The process of claim 1 wherein said thermoplastic material is a polyolefin. --

Col. 30, claim 11, correct to read as follows:

-- The process of claim 1 wherein said inorganic material is magnesium carbonate. --

Signed and Sealed this eighth Day of June 1976

[SEAL]

Attest:

RUTH C. MASON
*Attesting Officer*

C. MARSHALL DANN
*Commissioner of Patents and Trademarks*